United States Patent [19]

Staffeld

[11] Patent Number: 4,507,817
[45] Date of Patent: Apr. 2, 1985

[54] CONNECTOR AND INSERTION TOOL

[76] Inventor: Stanley E. Staffeld, 1621 Woodsboro, Royal Oak, Mich. 48067

[21] Appl. No.: 309,912

[22] Filed: Oct. 8, 1981

[51] Int. Cl.³ .............................................. B25F 1/00
[52] U.S. Cl. ........................................... 7/158; 7/165; 81/429; 411/395
[58] Field of Search ..................... 7/158, 165; 411/395; 81/429

[56] References Cited

U.S. PATENT DOCUMENTS

| | | | |
|---|---|---|---|
| 775,090 | 11/1904 | Pilz | 229/49 |
| 1,116,841 | 11/1914 | Powell | 446/112 |
| 1,124,504 | 1/1915 | Mueller | 285/219 |
| 1,206,760 | 11/1916 | Harris | 446/109 |
| 1,336,626 | 4/1920 | Hall | 446/109 |
| 1,398,852 | 11/1921 | Gilbert | 446/112 |
| 1,487,102 | 3/1924 | Hodgson | 446/112 |
| 2,659,255 | 11/1953 | Bates | 31/57 |
| 2,705,030 | 3/1955 | Koffler et al. | 144/32 |
| 2,821,761 | 2/1958 | Meyers | 24/73 |
| 3,120,078 | 2/1964 | Bessinger | 46/31 |
| 3,289,290 | 12/1966 | Sandor | 29/432 |
| 3,355,837 | 12/1967 | Pedersen | 46/17 |
| 3,817,146 | 6/1974 | Scott | 85/1 P |
| 3,913,289 | 10/1975 | Recker | 52/285 |
| 4,015,505 | 4/1977 | Murray | 85/77 |
| 4,218,953 | 8/1980 | Haytayan | 85/68 |

Primary Examiner—Roscoe V. Parker
Attorney, Agent, or Firm—Krass & Young

[57] ABSTRACT

A unique connector and insertion tool are disclosed. The connector is hollow with screw-type threads on its outer surface, an enlarged head at one end and a non-sharp configuration at the other end. The insertion tool has a non-sharp elongated shaft or piercer attached to a handle; the end of the piercer is adapted to allow piercing and passage through the materials being secured together. The connector slides over the piercing shaft, is held in secure non-rotating relation thereto, and is configured to penetrate the materials and be screwed into place by the insertion tool. The entire piercing and connection operation may be conducted in a twisting motion with just one hand.

18 Claims, 24 Drawing Figures

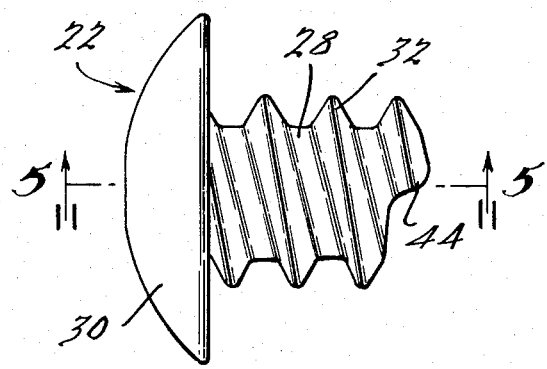
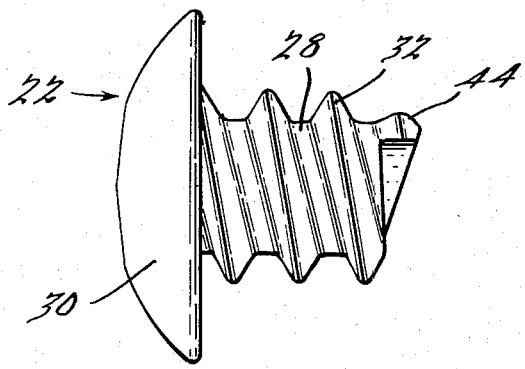
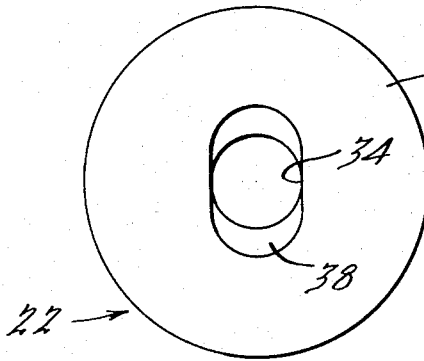
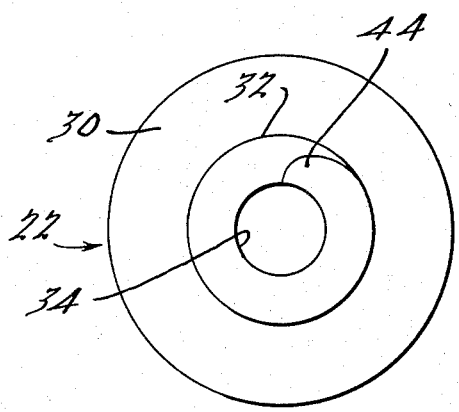
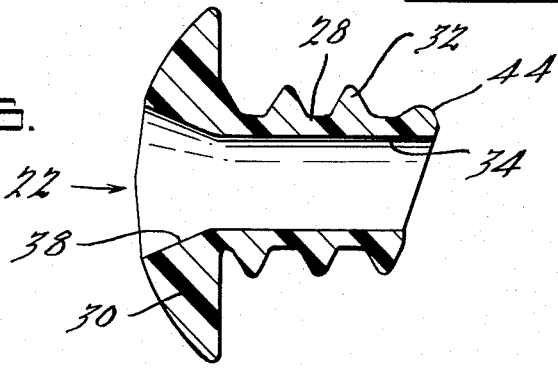
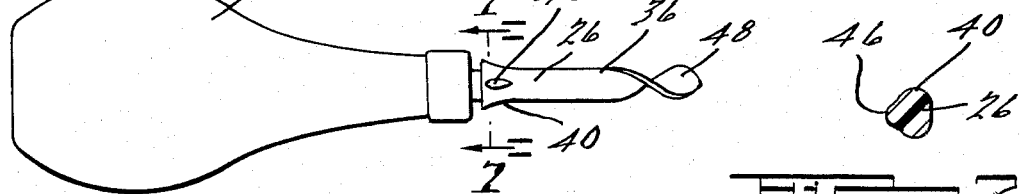

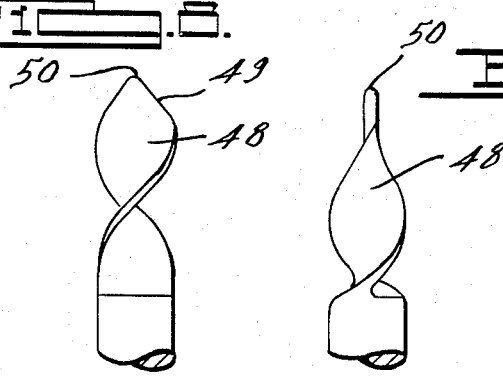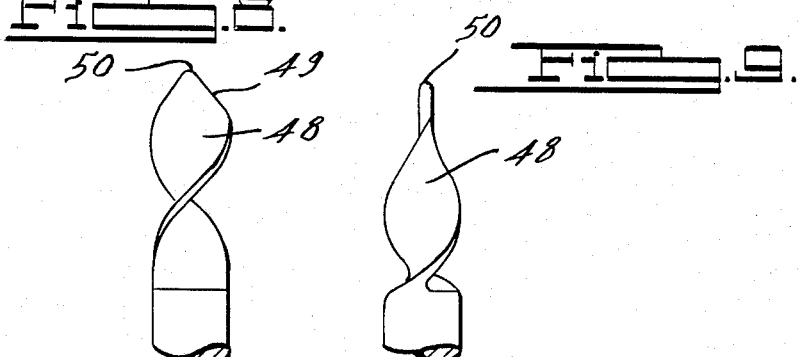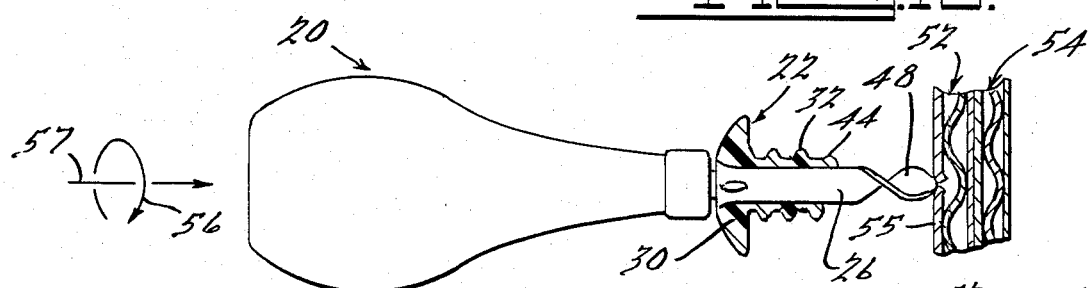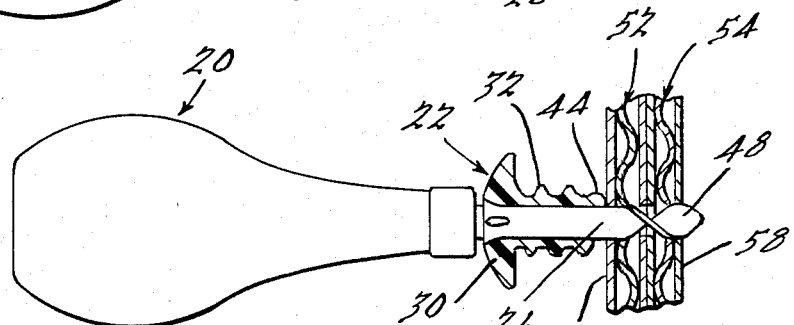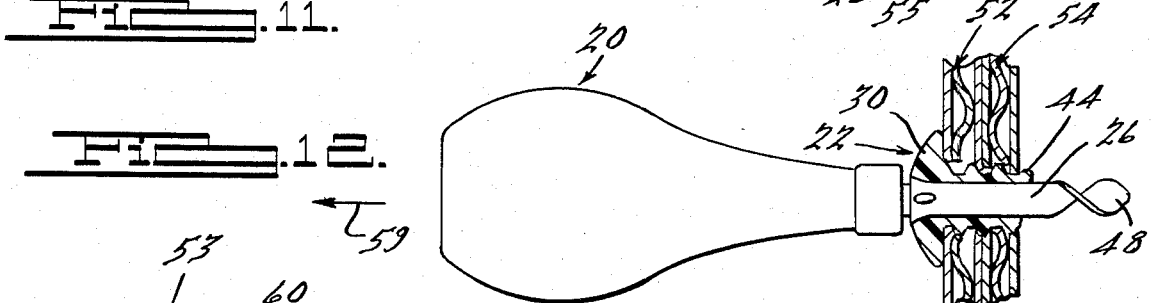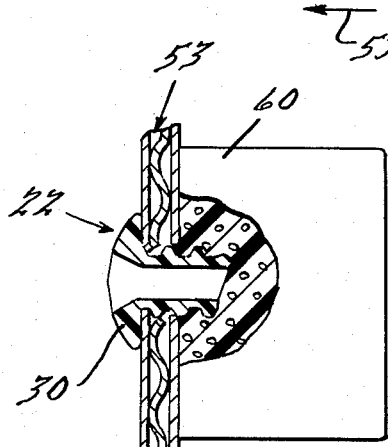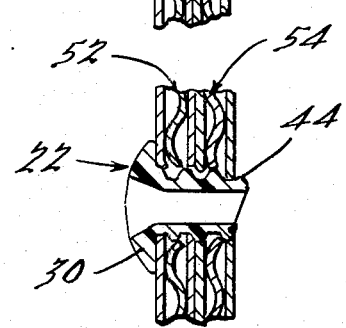

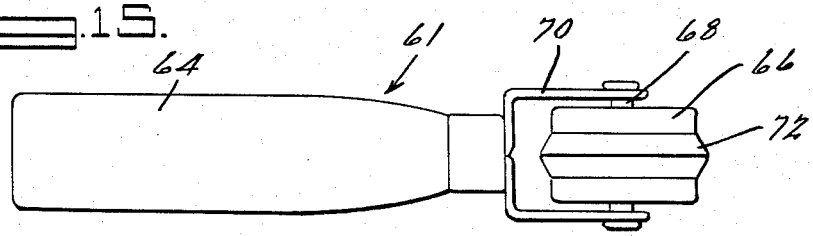
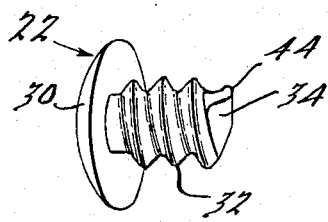
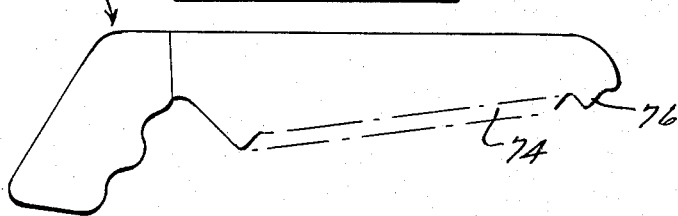
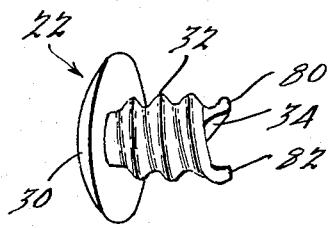
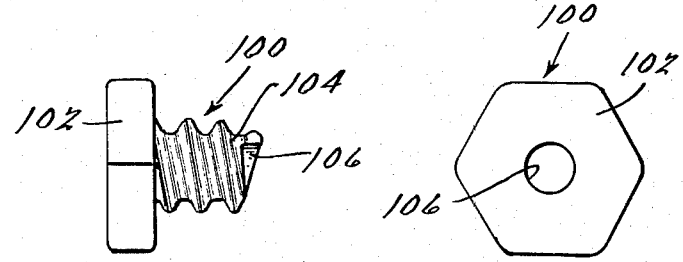
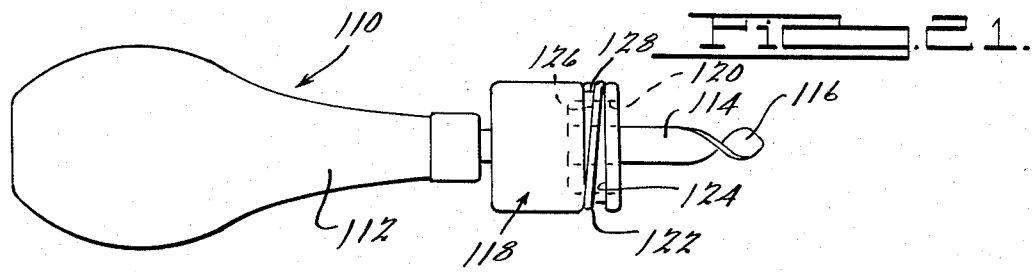
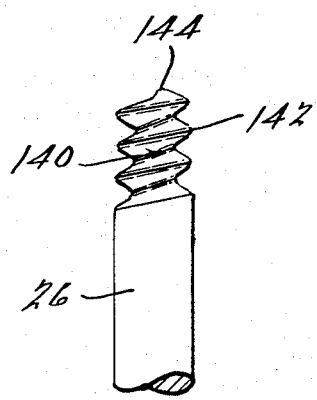
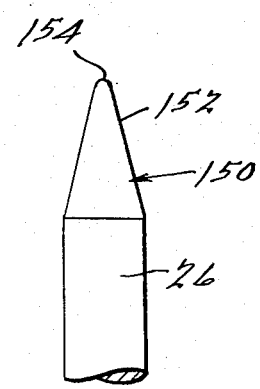
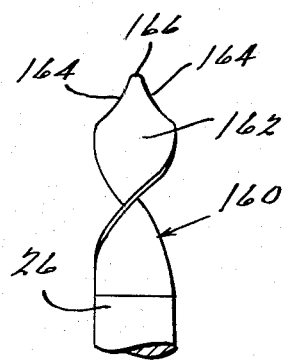

CONNECTOR AND INSERTION TOOL

BACKGROUND AND SUMMARY OF THE INVENTION

This invention relates to a unique connecting system for fastening pierceable materials together. In particular, the invention relates to a unique connector and insertion tool for fastening corrugated board (commonly called "cardboard") and/or foamboard together. The connecting system is designed from the standpoints of safety and ease of use so that it can be used by children. The connectors can be reused over and over again and many varied types of structures and enclosures can be made with them.

There are numerous known connecting devices and systems which can be used to fasten together pieces of corrugated board and the like. Most of them have one or more deficiencies, however, which have prevented their widespread use or application. Some of the connectors are disposable (can only be used one time) or are permanent once installed (cannot be removed and reused). Other connectors have a plurality of parts or require the initial time consuming procedure of first cutting holes or slots in the materials. Still other connectors do not provide a solid connection, are difficult to use, or require a plurality of tools in order to insert and secure the connectors in place. Moreover, most of the known connectors are either too sharp or dangerous for children to work with, or are too difficult and frustrating for them to use.

It is an object of the present invention to overcome the above described deficiencies and disadvantages with existing connectors and connecting mechanisms. It is another object of the invention to provide a connector which is inexpensive, easy to use, can be reused repeatedly without losing its integrity or fastening ability, and is safe for children to use. It is a further object of the invention to provide an insertion tool for the connectors which is easy to use, can be used with one hand, and is safe and fun for children to use.

The above and other objectives of the invention are achieved by the unique connectors and insertion tool described and claimed herein. The connectors are shaped somewhat like screws with an enlarged head on one end and a screw-like thread along the outer surfaces of the shank. Unlike screws, however, the connectors are hollow and have safe (non-sharp) insertion ends. The insertion tool has a handle secured to a non-sharp elongated shaft or piercer. The shaft is adapted to fit inside the hollow channel of the connectors, be releasably secured thereto, and mated in a manner which prevents the connectors from rotating relative to the tool when they are being inserted. The end of the shaft which passes through the connectors is adapted to pierce the materials allowing the connectors to be screwed into place in order to hold the materials firmly together. Also, the entire piercing and connecting operation is conducted in a turning or twisting motion with just one hand.

Other objects, features and advantages of the invention will become apparent when the following description is viewed in association with the accompanying drawings.

BRIEF DESCRIPTION OF THE DRAWINGS

FIG. 1 depicts a side view of one of the unique connectors of the invention;;

FIG. 2 is an orthogonal side view of the connector of FIG. 1;

FIG. 3 is an end view of the connector of FIG. 2 from the head end;

FIG. 4 is an end view of the connector of FIG. 2 from the body end;

FIG. 5 is a cross-section of the connector of FIG. 1 taken along lines 5—5 of FIG. 1.

FIG. 6 depicts an embodiment of the unique insertion tool of the invention;

FIG. 7 is a cross-sectional view taken along lines 7—7 of FIG. 6;

FIGS. 8 and 9 show enlarged orthogonal views of the end of the preferred insertion tool piercer;

FIGS. 10–13 illustrate the use of the unique insertion tool and connectors of the present invention in fastening two pieces of corrugated fiberboard or cardboard together;

FIG. 14 is a view in partial cross-section of a connector fastening a piece of corrugated board to a piece of foamboard.

FIG. 15 illustrates a creasing tool for use with the present invention;

FIG. 16 illustrates a saw-type tool for use with the present invention;

FIGS. 17 and 18 respectively illustrate single and double threads on connectors;

FIG. 19 depicts a side view of a further embodiment of a connector;

FIG. 20 is an end view of the head of the connector shown in FIG. 19;

FIG. 21 depicts another embodiment of an insertion tool for the invention and one which is specifically adapted for use with the connector of FIGS. 19 and 20; and FIGS. 22–24 depict other embodiments of the end of the insertion tool.

DESCRIPTION OF THE PREFERRED EMBODIMENTS

The preferred embodiments of the insertion tool 20 and connector 22 are shown in FIGS. 1–9. The insertion tool 20 has a handle 24 connected to an elongated shaft or piercer 26. The connector 22 has a central cylindrical shaped body 28 with an enlarged and flattened head 30 at one end. An enlarged helical screw-type thread 32 is positioned on or incorporated in the outer surface of the body 28 and the body is hollow with a passageway or channel 34 therethrough.

The cross-sectional shape of the passageway 34 is preferably circular and matches the cross-section of the main portion 36 of the shaft 26 on the insertion tool 20. In this regard, the cross-section of the portion 36 of the shaft 26 in the drawings is circular and in the preferred embodiment, has a diameter of approximately 7/32 of an inch. The size of the passageway 34 is also slightly larger than the size of the shaft 26 so that the connector can be easily positioned on the shaft and be easily removed therefrom.

The end 38 of the passageway 34 adjacent the head 30 of the connector 22 is enlarged and changed to being oval in cross-section. Correspondingly, the end 40 of the piercer of the insertion tool 20 adjacent the handle 24 is also enlarged and similar in cross-section to the end 38 of the passageway 34. (This is shown in FIG. 7.) When the connector 22 is positioned on the tool 20, the end 38 mates with the end portion 40 of the shaft and prevents the connector from rotating relative to the shaft. This anti-rotational feature will be maintained so long as such mating position is retained. It is understood, of course, that there are other means by which the connectors could be keyed to or mated with the shaft in order to prevent relative rotation in accordance with the invention; the mating cross-sections described above (enlarged and non-circular) only constitutes one way in which this could be accomplished.

All parts of the connector 22 and the insertion tool 20 have a non-sharp configuration. The term "non-sharp" means compliance with the United States Government Consumer Product Safety Commission Sharp-point and Sharp-edge tests as described in 16 C.F.R. 1501.48 (Jan. 1, 1980) and 16 C.F.R. 1501.49 (Jan. 1, 1980) respectively. These tests are based on research conducted by the National Bureau of Standards and assure safe use by children or any other persons.

On the connector 22, the edges of the head 30 and the outer edges of the threads 32 are rounded to a minimum diameter of 7 mils to make them non-sharp. In addition, the end protrusion 44 of the thread 32 is rounded well beyond that necessary to pass the sharpness tests.

Once the connector 22 is positioned on the piercer or shaft 26 of the insertion tool 20, a mechanism is provided to releasably hold the connector in place thereon during the assembly process. For this purpose, a raised nub or projection 46 is provided on the portion 40 of the shaft 26. When the connector is slid along the probe 26, it is pushed toward the handle 24 until it is wedged in place on the nub 46. Once the connector is positioned on the tool in this manner, the connector can be installed in position with one hand. This aids the installer significantly as it leaves the other hand free for grasping or holding together the materials being secured together.

The side of the nub 46 toward the insertion end 48 of the shaft is preferably formed to blend in with the slope of the portion 40 (which changes in cross-section from circular to oval). This allows the connector to be seated more easily on the tool and also be removed more easily once the connector is screwed into place.

The end or tip 48 of the piercer or shaft 26 is designed and formed to allow accurate, safe and easy penetration and insertion of the piercer into and through the materials being fastened together. The tip 48 can have one of several shapes and configurations (as described below), but preferably has the shape and configuration shown in FIGS. 6, 8 and 9. The tip 48 is formed as a flat ribbon helix; this is as though the tip was first flattened and then twisted into the shape shown.

FIGS. 8 and 9 show enlarged orthogonal views of the end of the piercer. A flat-ribbon helix of the type shown is inherently a double-screw thread and in the preferred embodiment has a pitch of ⅓ inch. The thickness of the blade is 30 mils and all of its edges are rounded to a minimum diameter of 30 mils. In FIG. 8, the angled part 49 approaching the end has an included angle of 90° and in this view, the outermost tip 50 is further rounded to a diameter of 60 mils.

Use of the connecting system is illustrated in FIGS. 10–13. In this series of illustrations, the rotational axis of the tool 20 and the connector 22 is in the plane of the drawing, and the connector 22 and the two sheets 52 and 54 of corrugated board that are to be fastened together are shown in cross-section.

In FIG. 10, the connector 22 has been slid onto the piercer 26 and is releasably held in place by the nub 46. The piercer 26 is shown just penetrating the nearest liner 55 of the first piece of corrugated board 52. Rotation of the tool in direction 56 with pressure in direction 57 results in the condition shown in FIG. 11 where the end 48 of the piercer 26 is shown having just completed penetration of the farthest liner 58 while the end protrusion 44 of the connector is shown just beginning penetration of the nearest liner 55. In this regard, 3 pounds of pressure is sufficient to accomplish this step with the most commonly used variety of corrugated board having a liner thickness of 7 mils.

In progressing from the condition shown in FIG. 10 to that shown in FIG. 11, the helical end 48 of the piercer 26 has functioned to control the penetration. Being helical, the end 48 of the piercer penetrates the materials only while it is being rotated so the operator has full control of the penetration speed throughout the operation. This gives the operator the safe and comfortable feeling that his free hand (which is normally positioned behind the area of insertion) will not be hurt in any way.

In the preferred embodiment, the full diameter portion of the piercer tip 48 extends at least 5/16 inch beyond the end of the connector 22 so that, with the most commonly used variety of corrugated board (5/32 of an inch thick), all piercing will be complete when the end protrusion 44 begins penetration of the nearest liner 55. This is the condition illustrated in FIG. 11.

Since penetration of the piercer end 48 is complete in the condition shown in FIG. 11, only the connector insertion force is encountered in progressing to the condition shown in FIG. 12 where the connector 22 is fully inserted. Typically, the axial force necessary for connector insertion is less than that necessary for the initial piercing because a hole has already been made and the connector draws itself in as the tool 20 is further rotated. Also, in progressing from the condition in FIG. 11 to that shown in FIG. 12, the shaft 26 acts as a stabilizing guide which further facilitates the insertion.

The insertion process is continued until the enlarged head 30 of the connector 22 engages the surface of the nearest liner 55. If rotation of the insertion tool 20 is unnecessarily continued after the connector 22 is in place and the threads that the connector has formed in the corrugated board are stripped, the holding power of the connector 22 remains quite satisfactory with connectors having a thread pitch of 1/7 inch.

The insertion tool 20 is released from the connector 22 by pulling it away from the corrugated board by applying a force in the direction 59 without rotation (as shown in FIG. 12). The resulting inserted connector is shown in FIG. 13. The tool 20 is then ready for reuse for inserting other connectors in place. The connectors 22 installed in this manner will remain firmly in place until it is desired or necessary to remove them. Also, because the end protrusion 44 of the connector 22 is even duller than that necessary to pass the sharpness tests, and because the diameter of the shank of the connector is preferably 7/16 of an inch, there is little tendency for the end protrusion 44 to snag clothing and no cap or other protection is required.

If the body length is ½ inch, it is possible to fasten and hold firmly together three sheets of corrugated board of the most commonly used variety (5/32 of an inch thick).

For removal of the connector 22, the insertion tool 20 is used against with reverse rotation and the insertion process is simply repeated, but in reverse sequence.

Numerous pieces of corrugated board can be held firmly together through use of the unique connectors and insertion tool of the present invention, and many various structures can be built utilizing them. In particular, children can have hours of creative enjoyment constructing various enclosures, furniture, boxes and the like from scrap cardboard that is found around the house. With the present invention, the structures also can be disassembled later and the connectors reused for other projects.

It is also possible, of course, to use the connecting system of the present invention for fastening together materials other than corrugated cardboard. For example, FIG. 14 depicts the use of the present invention in connecting together a piece of corrugated board 53 to a piece of plastic foam material 60.

It is further understood that the insertion tool and connector can be made of any material so long as they have the necessary strength and structural characteristics to accomplish the purposes and functions described above. preferably, however, the handle 24 of the insertion tool 20 is made of wood or plastic and the shaft 26 is made of a metal material, such as steel. Also, the connectors 22 are preferably made of a moldable plastic material, such as polystyrene, although they could also be made of a metal material, such as steel or aluminum.

When the fastening system is used to make a structure from corrugated cardboard, it is often necessary to cut and fold some of the pieces of cardboard. For this purpose, a creasing tool 61 and a cutting knife 62 are utilized, as shown in FIGS. 15 and 16, respectively. The creasing tool 61 has a handle 64 and a roller 66, the roller being mounted on an axle 68 and a supporting yoke 70. The roller 66 has a raised ridge 72 on its outer surface. In the preferred embodiment, the ridge 72 is raised 90 mils over the roller 66 and has an included angle of 90 degrees. When the roller is rolled over the surface of the cardboard with moderate pressure applied by the operator, a crease is formed in the cardboard without cutting it. The piece of cardboard then can be bent easily along that crease. By the use of the creasing tool 61 together with the connecting system described herein, complex and intricate structures, such as chairs with arms, backs and legs, can be formed.

The cutting knife 62 similarly is used in the fabrication of corrugated cardboard structures. The cutting edge 74 of the knife is non-sharp, having teeth 76 preferably with the same configuration as the end configurations 48, 49, 50 of the piercer 26 spaced ⅛ inch apart. With this configuration, the knife is sufficiently sharp to cut easily through corrugated board, but not sharp enough to cut skin.

In the preferred embodiment of the invention, the connectors 22 can have either a single or double thread form. FIGS. 17 and 18, respectively, illustrate single and double threads on connectors. If both connectors have the same pitch, the double thread embodiment will turn into the material more quickly with one-half as many revolutions of the tool, but it will have slightly less holding power. Also, with the double-thread connector, two end protrusions 80 and 82 are provided on the insertion end thereof.

Other connector and insertion tool embodiments can be used in accordance with the present invention. Some of these are shown in FIGS. 19–24.

The connector 100 of FIGS. 19 and 20 differs from connector 22 in its head configuration and in the manner in which it is releasably held on the insertion tool. The head 102 is hexagon shaped in cross-section and the body 104 has a cylindrical-shaped passageway 106 of constant cross-section through the center thereof.

The insertion tool 110 used to install the connector 100 in place is shown in FIG. 21. The tool 110 has a handle 112, a shaft or piercer 114 with a penetration tip 116, and a connector holding mechanism 118. The holding mechanism 118 has a hexagon-shaped socket 120 adapted to mate with and hold the head 102 of the connector 100 in a non-rotating relationship. A wire-type spring clip 122 is positioned in a groove 124 in the outer surface of the mechanism 118, the spring clip having an end 126 which is inserted through a hole 128 in the bottom of the groove 124. When a connector 100 is placed on the shaft 114 and into the socket 120, the end 126 of the spring clip impinges against the head of the connector. In this manner, the connector is held onto the insertion tool essentially by friction.

As mentioned above, the end of the elongated shaft 26 on the insertion tool 20 has an end 48 which is adapted to penetrate the surface of the materials and initiate the insertion of the connectors through the materials. (The preferred form of end is shown in FIGS. 6, 8 and 9.) Other forms in which the end or tip 48 may take are shown in FIGS. 22, 23 and 24. In FIG. 22, the tip 140 has a screw-type thread 142 on its outer surface with a non-sharp penetration point 144. In FIG. 23, the tip 150 has a cone-shaped configuration 152 and a non-sharp point 154. The configuration 152 can be either a solid cone or flattened on one or two sides like a blade. In FIG. 24, the tip 160 is made of a flat helix blade 162 with a pair of concave shaped surfaces 164 near its outer end. The point 166 at the outermost tip has a non-sharp configuration.

It is to be understood that the foregoing description describes only preferred embodiments of the invention and that various changes and modifications may be made without departing from the spirit and scope of the invention as defined by the appended claims.

I claim:

1. A system for essentially monomanually fastening together at least two plies of relatively soft material such as corrugated board, said system comprising an insertion tool and at least one connector, the insertion tool comprising a handle and an elongated penetration shaft attached to said handle, said penetration shaft including flat ribbon helix portion at the distal end thereof and an overall length which is greater than that of the connector, said connector having a head and body with a passageway therethrough for mounting on said shaft, whereby when the connector is mounted on insertion tool, at least an operative portion of the flat ribbon helix portion extends ahead of the body of the connector to be turned through the material in a controlled fashion thereby allowing the shaft of the tool with the connector thereon to be inserted through the plies of material, the connector to be fixed in place holding the plies together, and the insertion tool to be axially withdrawn leaving the connector in place.

2. The system as set forth in claim 1 wherein said shaft has a penetration tip thereon, said tip having a non-sharp point thereon.

3. The system as set forth in claim 1 wherein said connector has a thread-type configuration of its outer surface, the connector passageway and the tool shaft being configured to prevent relative rotation between the connector and tool whereby the insertion tool with the connector thereon is screwed through the pieces of material in order to position the connector in its fastening position.

4. The system as set forth in claim 3 wherein said thread-type configuration ends in at least one non-sharp point at the end of the connector body opposite from said head.

5. The system as set forth in claim 1 further comprising first means on said shaft for releasably holding said connector thereon.

6. The system as set forth in claim 5 wherein said first means comprises a raised member which mates in frictional relationship to a said passageway in said connector.

7. The system as set forth in claim 1 in which the end of the passageway adjacent said head is enlarged in cross-section relative to the rest of the passageway and also is of a different cross-sectional configuration than the rest of the passageway.

8. The system as set forth in claim 7 in which a portion of said shaft adjacent said handle has a cross-section corresponding to the cross-section of said enlarged end of said passageway.

9. An unpowered connecting means for mono-manually connecting together two or more plies of material, said means comprising manually operated insertion tool and a plurality of connectors, both said tool and said connectors having material entry ends of a non-sharp, configuration, said insertion tool including a penetration shaft having a twisted flat ribbon portion at the distal end thereof, and said insertion tool with one of said connectors mounted axially thereon being operable by one hand to secure together said pieces of material with said connector.

10. Apparatus for securing together two or more plies of a soft material such as corrugated board comprising:
an externally-threaded fastener having an enlarged head portion and a shank portion, a through bore formed axially in the fastener, the shank portion terminating in a relatively blunt, leading thread edge remote from the head portion;
and an insertion tool comprising a handle portion and a piercing shaft terminating in a flat-ribbon helix, the shaft being of such diameter and length as to fit axially within the bore of the fastener with at least a substantial part of the flat ribbon helix portion extending beyond the leading edge of the fastener; whereby the shaft with the fastener mounted axially thereof may be turned manually to controllably pierce and turn through said plies until the leading edge of the fastener is adjacent the material, and the tool may thereafter be operated to cause the fastener shank to enter said plies.

11. Apparatus as defined in claim 10 wherein the ratio of the length of the fastener shank to the diameter of the fastener shank is approximately 1:2.

12. Apparatus as defined in claim 10 wherein the shank of the fastener is threaded.

13. Apparatus as defined in claim 12 wherein said tool and said fastener are configured so as to prevent relative rotation therebetween during operation of the tool.

14. Apparatus as defined in claim 13 wherein the passageway through the fastener is non-round over at least a portion thereof and the mating portion of the tool is non-round.

15. Apparatus as defined in claim 10 wherein the fastener is constructed of solid plastic.

16. Apparatus for securing together two or more plies of a soft material such as corregated board comprising:
an insertion tool comprising a handle and an axially extending shank which terminates in a distal end capable of penetrating said plies, said shank comprising, over a substantial portion of its length contiguous with the distal end, an essentially landless, long pitch helix which may be non-boringly screwed through one of said plies after penetration by said pointed distal end; and
a fastener having an axial body of lesser axial length than the shank of said tool and having an axially through bore which permits said fastener to be mounted coaxially on said shank.

17. Apparatus as defined in claim 16 wherein the fastener is threaded and is configured to prevent relative rotation between the fastener and the tool shank.

18. Apparatus as defined in claim 16 wherein the fastener is constructed of solid plastic.

* * * * *